United States Patent [19]

Sasaki et al.

[11] 4,297,413

[45] Oct. 27, 1981

[54] CONCENTRIC COMPOSITE CONJUGATE YARNS AND A PROCESS FOR MANUFACTURING SAME

[75] Inventors: Tohru Sasaki; Hiroyuki Endoh; Hiroshi Ohhira, all of Iwaki, Japan

[73] Assignee: Kureha Kagaku Kogyo Kabushiki Kaisha, Tokyo, Japan

[21] Appl. No.: 143,145

[22] Filed: Apr. 23, 1980

Related U.S. Application Data

[62] Division of Ser. No. 928,301, Jul. 26, 1978, abandoned.

[30] Foreign Application Priority Data

Jul. 27, 1977 [JP] Japan ................................. 52-89197

[51] Int. Cl.³ .............................................. D02G 3/00
[52] U.S. Cl. .................................... 428/394; 264/174; 264/290.5; 428/373; 428/395

[58] Field of Search ............... 428/373, 374, 375, 394, 428/395; 57/258; 43/44.98; 264/171, 210.7, 210.8, 174, 290.5

[56] References Cited

U.S. PATENT DOCUMENTS

| 2,291,670 | 8/1942 | Wiley et al. ........................ 264/210.8 |
| 3,463,652 | 8/1969 | Whitesel et al. ................. 264/174 X |
| 3,886,015 | 5/1975 | Turner ................................. 428/373 |

Primary Examiner—Lorraine T. Kendell
Attorney, Agent, or Firm—Fleit & Jacobson

[57] ABSTRACT

The invention resides in a strong conjugate composite yarn highly adapted for use as a fishing line. The core material is a polyolefin having double refrax $\Delta n$ amounting to at least $30 \times 10^{-3}$. The sheath material is a polyamide or a polyester. The both core and sheath components are highly stretched and oriented.

8 Claims, 3 Drawing Figures

CONCENTRIC COMPOSITE CONJUGATE YARNS AND A PROCESS FOR MANUFACTURING SAME

This is a divisional of application Ser. No. 928,301, filed July 26, 1978, now abandoned.

BACKGROUND OF THE INVENTION

This invention relates to a core-sheath conjugated yarn, and more specifically, it relates to such yarn as above, wherein the core comprises a polyolefin and the sheath comprises a crystallizing resin other than polyolefin. The invention further relates to a process for the manufacture of the conjugated yarn of the above kind which presents a favorable strength characteristic.

It is well known to produce a sheath-and-core type conjugated yarn in such a way that mutually exclusive synthetic resins are extruded from a concentric composite orifice unit and the extruded product is then subjected to a stretching step. However, it should be noted that different spinnable synthetic resins have respective and different stretching conditions adapted for the realization of their respective optimum strength characteristics. Thus, the strength of a yarn element contained in the conjugate yarn is naturally and highly dependent upon the conditions governing the after-stretching step. If the composite yarn element has been subjected to different after-stretching conditions than those which are optimum, it will result in a rather inferior strength characteristic. As an example, a polyolefinic resin, such as polyethylene or polypropylene, requires generally a rather higher stretching ratio than other crystalline resins for optimum strength characteristic. The ratio is preferably 7–10 for polypropylene yarns and the tensile as well as knot strength thereof will substantially drop when the extruded yarns are stretched with a lesser stretching ratio. On the other hand, the optimum stretching ratio for extruded polyamide or polyester, as a further example, amounts generally to 4.0–6.5. When this kind of yarn or monofilament is forcibly stretched with a higher ratio than above specified, it could be experienced that the yarn is at least fibrillated or upon occasion even subject to breakage. It is, therefore, a common practice as adopted by and among those skilled in the art to stretch an unoriented composite and conjugated yarn of polyolefin/polyamide or polyolefin/polyester, to a degree of stretch ratio not higher than the maximum allowable one for polyamide or polyester, although, in this case, the polyolefin component is not stretched enough to present its sufficient strength value.

Fishing lines are required to have highest possible yarn stretch for a predetermined yarn diameter or denier. However, fishing lines when they are manufactured according to the known conjugated process hereinabove described, leave much to be desired in their strength requirements.

SUMMARY OF THE INVENTION

It is, therefore, the main object of the present invention to provide a sheath-core type conjugated yarn which is highly adapted for use as a fishing line.

This and further objects, features and advantages of the present invention will become more apparent when reading the following detailed description of the invention with reference to the accompanying drawings, in which:

DETAILED DESCRIPTION OF THE INVENTION

Figure 1:
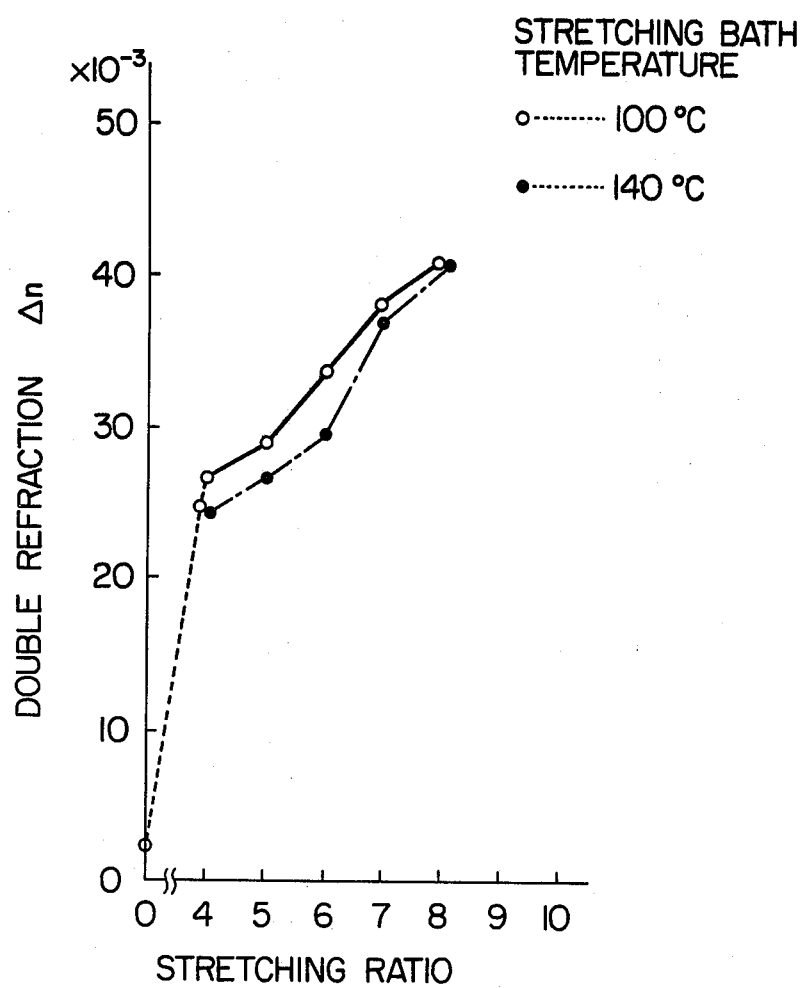
FIG. 1 is a diagram showing the relationship between the stretching ratio and the double refrax of a sample polypropylene monofilament.

The sheath-core type conjugated strong composite yarn according to this invention is manufactured in such a way that a medium-oriented polyolefin is prepared at first as its core component, and then a different unoriented crystalline resin from the polyolefin is covered around the core component, so as to provide the sheath component. Then, the thus provided composite yarn is subjected further to at least an after-stretching step to such a degree that the double refrax $\Delta n$ of the core polyolefin amounts at least to $30 \times 10^{-3}$. More specifically, in this case, the double refrax $\Delta n$ of the preparatorily medium-oriented core yarn component may amount to from $10 \times 10^{-3}$ to $25 \times 10^{-3}$.

Such mediumly preoriented polyolefin core component as usable in the present invention can be prepared according to any of the prior art processes. The double refrax $\Delta n$ of the polyolefin melt-extruded under normally employed conditions may amount generally to $2 \times 10^{-3}$ to $8 \times 10^{-6}$. When the unstretched yarn is subjected to stretching, to the order of 1.5 to 4.0 times or so the $\Delta n$-value will be increased to $10 \times 10^{-3}$ to $25 \times 10^{-3}$. When the melt-extruded polyolefin yarn is wound up at a high speed, so as to invite a high draft orientation, the $\Delta n$-value will be increased to as high as $10 \times 10^{-3}$ to $20 \times 10^{-3}$.

If, however, the high draft orientation is performed at a high speed winding operation on a composite yarn with its core and the sheath components conjugated within or outside of a concentric coextruding composite orifice, not only the core resin component, but also the sheath resin component is subject to a molecular orientation, and thus, it will be highly difficult to provide optimal stretching and molecular orientation to the core as well as the sheath compoent.

For conjugatingly covering an outer sheath resin component onto the preoriented polyolefin core yarn component, conventional extrusion-covering composite die means preferably of the crosshead type, similar to those as frequently used for the manufacture of insulated electric wires, may be employed. In the practical manufacture of the conjugated yarn according to this invention, the preoriented core polyolefin yarn component is led through the core orifice of the composite die, while the outer sheath resin component is extruded through the concentric outer orifice of the same die, for covering the core yarn component. A direct sheath-core conjugated can naturally be executed. However, an intermediate application of a proper adhesive layer may preferred upon occasion. As an example, the polyolefin core yarn component is dipped in an adhesive solution bath, so as to cover the core yarn evenly with an adhesive layer and then, the thus precoated core yarn is coated further with the sheath resin component by the conventional extrusion process. In place of the bath-dipping precoating process, the adhesive agent may be applied also by the extrusion process simultaneously with the sheath resin covering process by use of a concentric triple nozzle unit in such a way that the core polyolefin preoriented yarn is passed through the core or innermost orifice, and the adhesive agent and the sheath resin component are extruded conjointly from the intermediate and the outermost ring oriffices of the nozzle, unit, respectively.

Then, the thus prepared composite and conjugated yarn is subjected to after-stretching under optimum stretching conditions adapted for the sheath resin component. The degree of this after-stretching is generally lesser than that which is to be required for enough and optimum stretching of a polyolefin yarn assumed to be unstretched at all. However, in the case of the present invention, the core polyolefin yarn have been already preoriented and thus, it can be sufficiently oriented by stretching under medium conditions as necessary only for stretching the outer sheath resin component, thereby the core yarn representing easily to have a $\Delta n$-value higher than $30 \times 10^{-3}$, and preferably amounting from $30 \times 10^{-3}$ to $40 \times 10^{-3}$.

The required $\Delta n$-value of the outer sheath resin component depends naturally upon the kind of resin employed for the outer sheath component, and thus can not generally be determined. As an example, it amounts to $40$–$60 \times 10^{-3}$ or so for polyamide resin and $230$–$300 \times 10^{-3}$ for polyester or so, thus representing an extremely high degree of orientation.

The after-stretching job can be executed in one complete step. However, two or more stretching steps may, when necessary, be executed at different operating temperature dividing and successively, so as to realize a sufficient degree of stretching in total. The stretching degree depends naturally upon the kind and nature of the sheath resin component, as well as the employed stretching temperature, but it may amount to 4 to 6 times or so in total, when the sheath material is polyamide or polyester as an example.

PREPARATORY EXAMPLE

Figure 2:
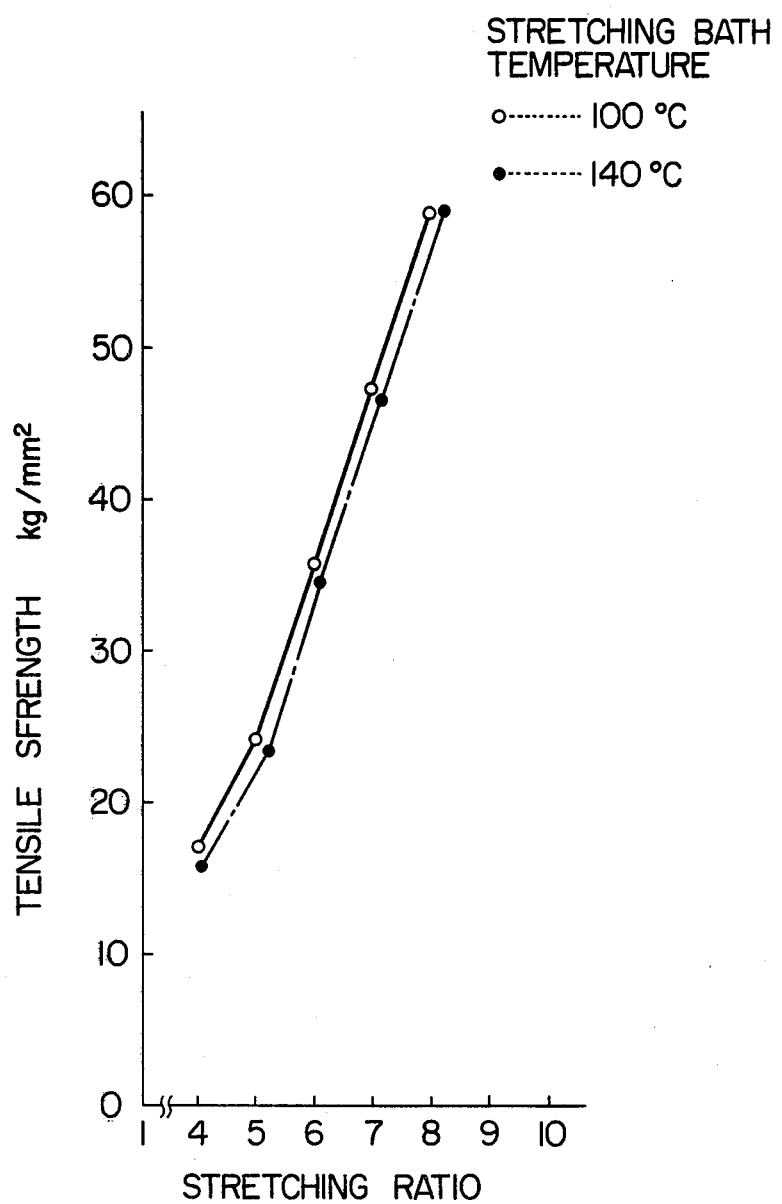
FIG. 2 is a diagram showing the relation ship between the stretching ratio and the tensile strength of a sample polypropylene monofilament.
Figure 3:
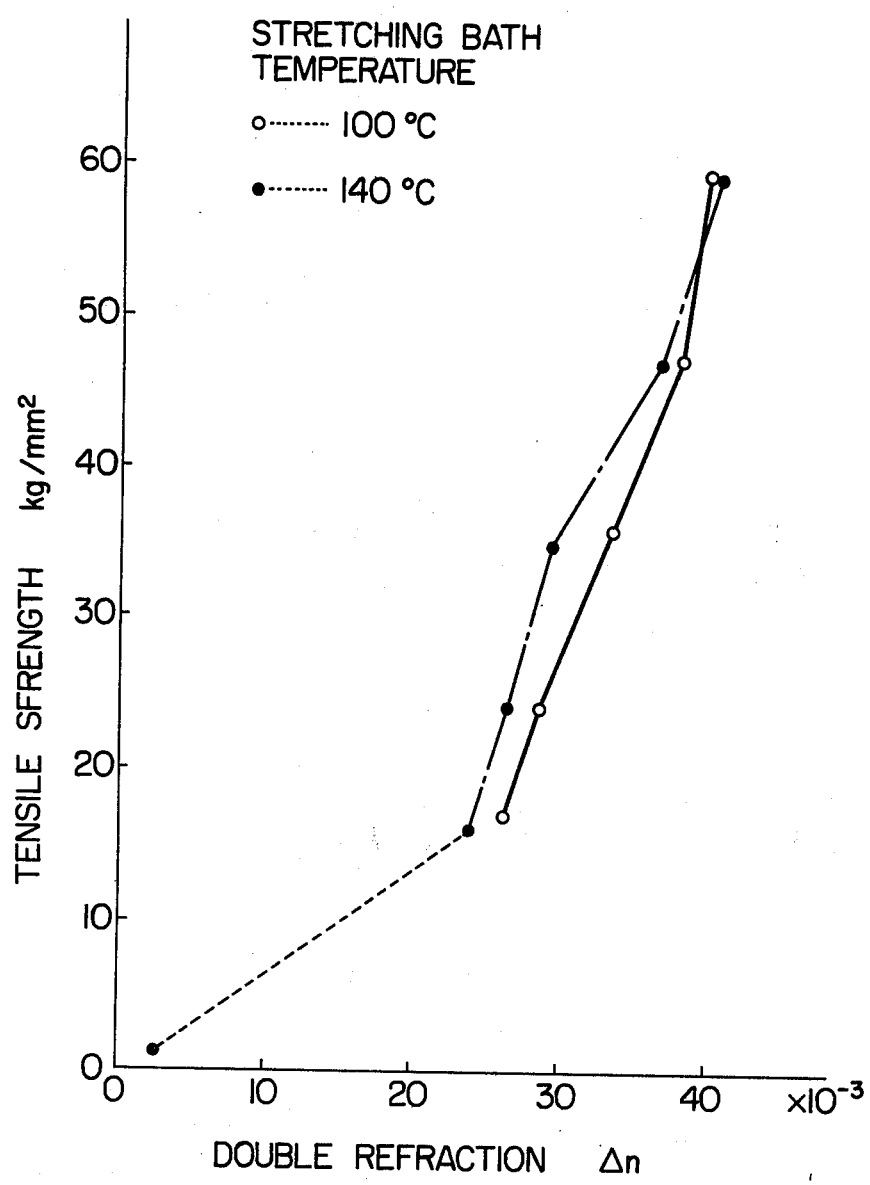
FIG. 3 is a diagram showing the relationship between the double refrax and the tensile strength of a sample polypropylene yarn.

Polypropylene, of M. I. 1.0, was melt-spun in the conventional way and cooled down, thereby providing continuous monofilaments, each having a diameter of $260\mu$ and a double refrax $\Delta n$ of $2 \times 10^{-3}$. These monofilaments were after-stretched at 100° C. or 140° C. to 4 to 8 times their lengths respectively. Then, the double refrax and tensile strength of each of the thus afterstretched monofilaments were measured. The double refrax plotted against the stretching factor is shown in FIG. 1. The relative relationship between the stretching factor and the tensile strength is shown in FIG. 2, while the double refrax and the tensile strength is shown in FIG. 3.

MAIN EXAMPLE

The polypropylene monofilaments obtained in the foregoing preparatory example were subjected to afterstretching to 3.0 times their length in a hot water bath at 95° C., so as to provide preoriented continuous monofilaments or yarns of $150\mu$ diameter, tensile strength of 20 kg/mm², ductility of 115%, and a double refrax $\Delta n$ of $15 \times 10^{-3}$.

One of these preoriented filaments was passed through the core orifice of a concentric composite orifice unit of the known crosshead type, while fused nylon 6-resin, M. I. 1.0, 270° C., was extruded from the outer ring nozzle of the composite orifice unit, so as to cover the preoriented core filament. And then, the conjugated yarn was rapidly cooled by passing through a cold water bath, 5° C.

The conjugated yarn was subjected at first to a 3.0-times stretching by passing through a first steaming atmosphere, 140° C., secondly to a 1.5-times stretching by passing through a second steaming atmosphere, 150° C. and finally to a 10%-reflaxation heat-treatment by passing through a 150° C.-steaming bath. In this way, a composite conjugate yarn of $250\mu$ was obtained.

The cross-sectional composing ratio: polypropylene/nylon of the composite yarn amounted to 30/70, tensile strength: 82 kg/mm²; ductility: 21%; specific gravity: 1.08. The diameter of the polypropylene core component filament was $75\mu$. Double refrax $\Delta n$: $37 \times 10^{-3}$.

COMPARATIVE EXAMPLE

The fused polypropylene resin and the fused nylon 6 polymer, both being same as used in the foregoing preparatory example were coextruded from the respective concentric orifices of a composite orifice unit using the nylon resin as sheath and the polypropylene as core.

The diameter of the orifice was $0.8$ mm$\phi$ and the composing crosssectional ratio: nylon/polypropylene was 75/25. The thus coextruded conjugate composite yarn was cast into a cold water bath, 5° C., and then after-stretched to a 4.0 times stretching in dry hot air atmosphere, 145° C., and successively to a 1.3 times stretching in a dry hot air of 150° C. Then, it was subjected to 5%-reflaxation heat treatment in dry hot air atmosphere of 185° C. The stretched composite yarn had a diameter of $250\mu$.

The composing cross-sectional ratio of this composite yarn amounted to 70/30. Specific gravity: 108. The straight tensile stength: 63 kg/mm². Ductility: 29%. Diameter of polypropylene core $75\mu$. Double refrax $\Delta n$: $26 \times 10^{-3}$.

The embodiments of the invention in which an exclusive property or privilege is claimed are as follows:

1. A concentric stretched conjugated yarn having
   (A) A polyolefin core component which is initially prestretched to have a double refraction index of from $10 \times 25^{-3}$ to $25 \times 10^{-3}$, and
   (B) A concentric sheath component which is a polyamide or polyester fused resin and which is initially unoriented, with the proviso that the conjugated yarn is stretched until the double refraction index of the polyolefin core component is at least $30 \times 10^{-3}$.

2. The conjugated yarn of claim 1, wherein the crystalline resin sheath component is a polyamide or a polyester.

3. The conjugated yarn of claim 2, wherein the double refraction index of the polyolefin core component is not more than $40 \times 10^{-3}$.

4. The conjugated yarn of claim 2, wherein the crystalline resin sheath component is a polyamide whose double refraction index after stretching is from about $40 \times 10^{-3}$ to about $60 \times 10^{-3}$.

5. The conjugated yarn to claim 2, wherein the crystalline resin sheath component is a polyester whose double refraction index after stretching is from about $230 \times 10^{-3}$ to about $300 \times 10^{-3}$.

6. The conjugated yarn of claim 2, wherein the polyolefin core component is polypropylene or polyethylene.

7. The conjugated yarn of claim 4, wherein the polyamide is nylon 6.

8. The conjugated yarn of claim 6, wherein there is an adhesive layer between the core and the sheath.

* * * * *

UNITED STATES PATENT AND TRADEMARK OFFICE
CERTIFICATE OF CORRECTION

PATENT NO. : 4,297,413
DATED : October 27, 1981
INVENTOR(S) : SASAKI et al

It is certified that error appears in the above—identified patent and that said Letters Patent is hereby corrected as shown below:

On the title page

In section [73], after "Kureha", first line, change "Kugaku" to read --Kagaku--.

Signed and Sealed this

Twenty-second Day of June 1982

[SEAL]

Attest:

GERALD J. MOSSINGHOFF

Attesting Officer     Commissioner of Patents and Trademarks